United States Patent
Lamard et al.

(10) Patent No.: US 9,978,151 B2
(45) Date of Patent: May 22, 2018

(54) METHOD AND SYSTEM FOR TRACKING MOVING OBJECTS

(71) Applicant: RENAULT S.A.S., Boulogne-Billancourt (FR)

(72) Inventors: Laeticia Lamard, Versailles (FR); Jean-Philippe Boyer, Clamart (FR); Roland Chapuis, Issoire (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 60 days.

(21) Appl. No.: 14/897,162

(22) PCT Filed: Jun. 10, 2014

(86) PCT No.: PCT/FR2014/051380
§ 371 (c)(1),
(2) Date: Jan. 29, 2016

(87) PCT Pub. No.: WO2014/199061
PCT Pub. Date: Dec. 18, 2014

(65) Prior Publication Data
US 2016/0232681 A1    Aug. 11, 2016

(30) Foreign Application Priority Data

Jun. 10, 2013   (FR) ...................................... 13 55320

(51) Int. Cl.
*G06K 9/00* (2006.01)
*G06T 7/20* (2017.01)
*G06K 9/32* (2006.01)
*G06K 9/52* (2006.01)
*G06K 9/62* (2006.01)
*G06T 7/60* (2017.01)

(52) U.S. Cl.
CPC ............ *G06T 7/20* (2013.01); *G06K 9/00791* (2013.01); *G06K 9/32* (2013.01); *G06K 9/52* (2013.01); *G06K 9/6201* (2013.01); *G06T 7/60* (2013.01); *G06T 2207/30252* (2013.01)

(58) Field of Classification Search
USPC ................ 382/103, 181, 286; 1/1; 244/3.16; 342/159, 160; 348/E5.05; 356/28
See application file for complete search history.

(56) References Cited

U.S. PATENT DOCUMENTS 6,421,116 B1 *  7/2002  Schilli ................... F41G 7/2226
                                                  244/3.16
6,542,621 B1    4/2003  Brill et al. .................... 382/103
(Continued)

OTHER PUBLICATIONS

International Search Report dated Nov. 4, 2014 for PCT/FR2014/051380 filed on Jun. 10, 2014.

(Continued)

*Primary Examiner* — Anh H Do
(74) *Attorney, Agent, or Firm* — Oblon, McClelland, Maier & Neustadt, L.L.P.

(57) ABSTRACT

A system and method for the tracking of target objects in motion includes observing targets, determining, recursively, a target type of the targets, tracking, recursively, movements of the targets, and determining whether a target is concealed. The tracking and the determining whether a target is concealed are deployed in consideration of the target type of the targets.

12 Claims, 3 Drawing Sheets

(56) References Cited

U.S. PATENT DOCUMENTS

| | | | |
|---|---|---|---|
| 7,499,571 B1 | 3/2009 | Han et al. | 382/103 |
| 9,030,351 B2 * | 5/2015 | Fox | G01S 7/2922 |
| | | | 342/159 |
| 9,551,784 B2 * | 1/2017 | Katuri | G01S 13/003 |
| 2004/0156530 A1 | 8/2004 | Brodsky et al. | 382/103 |
| 2005/0104962 A1 | 5/2005 | Han et al. | 382/103 |
| 2008/0226127 A1 | 9/2008 | Brodsky et al. | 382/103 |
| 2011/0123067 A1 | 5/2011 | Podilchuk | 382/209 |
| 2013/0051624 A1 | 2/2013 | Iwasaki et al. | 382/103 |

OTHER PUBLICATIONS

French Search Report dated Mar. 21, 2014 for FR 1355320 filed on Jun. 10, 2013.

\* cited by examiner

METHOD AND SYSTEM FOR TRACKING MOVING OBJECTS

BACKGROUND OF THE INVENTION

Field of the Invention

The invention relates to the tracking of target objects in motion, in particular, but not exclusively, objects in motion on a highway, the movements of which are tracked by an on-board system in a motor vehicle.

In motor vehicles, driver assistance systems are generally used which are designed to improve driver safety. In general, systems are used which observe the vehicle environment and may generate a hazard warning or act directly on the vehicle. To observe the vehicle environment, devices such as video cameras or radar devices are used.

In motor vehicles, speed regulators are also used which maintain a safe distance to the vehicle driving ahead of the vehicle, the speed of which is regulated. Other systems may track the movement of pedestrians or of other vehicles driving ahead of the vehicle. It will be understood that optical sensors such as video cameras can only detect visible obstacles. Consequently, information and decisions deduced directly from these sensors, i.e. without processing, may not be relevant.

In practice, in the event of "concealment" phenomena, where an object is hidden by another object, the concealed object which was being tracked by the sensor prior to its concealment will become invisible. In a speed regulation system, if the vehicle being followed is concealed by a bend, by a vehicle arriving in another direction, the system may conclude that the vehicle being followed has disappeared, and that it is possible to accelerate. Moreover, in systems which are capable of tracking pedestrians, it is necessary to detect the reappearance of a pedestrian who was concealed, for example by a vehicle. A pedestrian crossing a highway may be concealed by a vehicle during the crossing, then reappear. It is therefore necessary to anticipate their reappearance.

Reference may be made to the document "Dealing with occlusions with multi-target tracking algorithms for the real road context" (Lamard et al., Intelligent Vehicles Symposium (IV), 2012 IEEE), which describes the tracking of objects and the management of concealments.

Reference may also be made to the book entitled "Statistical multisource-multitarget, Information fusion", by Ronald P. S. Malher, which describes a module for the tracking of moving objects.

That being so, existing object tracking systems, even if they take account of concealment phenomena, do not permit the satisfactory achievement of the tracking of different objects in motion.

BRIEF SUMMARY OF THE INVENTION

The object of the invention is therefore the improvement of the tracking of objects.

According to one aspect, a method is proposed for the tracking of target objects in motion, comprising a first step for the observation of targets, a second recursive step for the tracking of the movements of said targets, i.e. the tracking of movement and the prediction of their movement, and a third step in which it is determined whether a target is concealed.

According to a general characteristic, the method comprises a recursive step for the determination of the target type, whereby the second step and the third step are deployed in consideration of the type of target.

The target is associated with information relative to the position and speed of the target which may be memorized and, in this case, updated.

During the observation step, a sensor may be used for the observation of a zone within which the objects constituting the targets are in motion.

A recursive step is understood as a step which permits the generation of one or more output values which are also considered as inputs for the next deployment of that step.

Accordingly, the recursive step for tracking target movements permits the updating of the movement of targets by the consideration of the movement of targets determined in the previous deployment of that step. This also applies to the recursive step for the determination of the type of target, in which predetermined target types are considered in the deployment of that step.

By the consideration of the type of target, for example a pedestrian or a vehicle, it is possible to predict the movement of targets more accurately, particularly in the event of concealment. In practice, a target of the pedestrian type is less voluminous and will move less rapidly than a target of the vehicle type. Moreover, by the consideration of the target type, it is easier to identify the number of targets being tracked, conversely to solutions which are known from the prior art.

The step for the determination of the target type may comprise determination of the width of a target, whereby the third step is deployed in consideration of the target width.

By the deployment of the step for the determination of the visibility of a target, it is established whether this target is concealed. Accordingly, it is particularly advantageous to identify the width of the target which is concealed, particularly in relation to other targets which may conceal the latter.

The second step may comprise a step for the determination of the appearance of further targets, a comparative step between the observation and a prediction of the status of targets, and a step for the simplification of the status of targets, whereby steps for the tracking of the movements of said targets are deployed in consideration of the target type.

Identification of the target type is advantageous in that it permits the exact determination of the number of targets, and prevents the replacement of a target of one type by a target of another type.

The third step may comprise a step for the construction of a concealment map, in consideration of the target type.

The step for the determination of the target type may comprise a step for the updating of target types, a step for the prediction of the target type, and a step for the determination of the target width.

According to another aspect, the object of the invention is a system for the tracking of target objects in motion, comprising a first module for the observation of targets, a second self-looped module, which is configured for the tracking of the movements of said targets, and a third module, which is configured to determine whether a target is concealed.

The system comprises a self-looped module which is configured to determine the target type, whereby the module configured to determine the target type communicates with the second module and the third module.

The module which is configured to determine the target type may be configured to identify the width of a target and to communicate said width to the third module.

The second module may comprise a sub-module for the determination of the appearance of further targets, a sub-module for the comparison of measurements generated by the sensor with a prediction of the status of targets, and a sub-module for the simplification of the status of targets, whereby the sub-modules communicate with the module which is configured to determine the target type.

The third module may comprise a sub-module for the construction of a concealment map, which communicates with the module which is configured to determine the target type.

The module for the determination of target type may comprise a sub-module for the updating of target types, a sub-module for the prediction of target types, and a sub-module for the determination of target widths.

According to yet another aspect, the object of the invention is a motor vehicle comprising the tracking system as defined above.

BRIEF DESCRIPTION OF THE DRAWINGS

The invention will be clarified by the detailed analysis of a number of modes of embodiment, which are considered by way of non-limiting examples, and are illustrated by the attached drawings, in which.

DETAILED DESCRIPTION OF THE INVENTION

Figure 1:
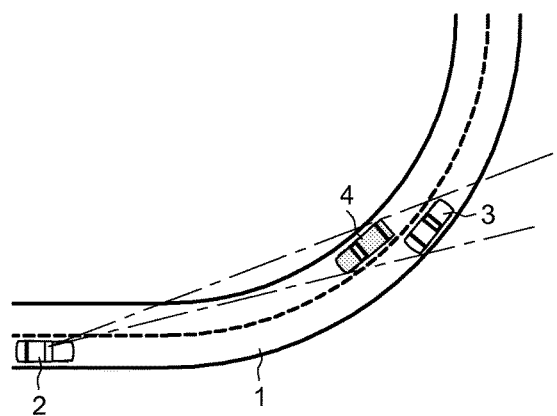
FIGS. 1 and 2 show a schematic illustration of a concealment phenomenon.

FIG. 1 represents an overhead view of a highway 1, on which a plurality of vehicles 2, 3 and 4 are driving. Vehicle 2 may comprise a system for the tracking of target objects in motion, for example a system according to the invention. Vehicle 2 may also comprise means for the regulation of speed, which employ information delivered by the tracking system to maintain a sufficiently large distance between two vehicles which are following each other. In this case, vehicle 2 may follow vehicle 3 which is on the same highway, while checking that the vehicles are separated by a sufficiently large distance.

Figure 2:
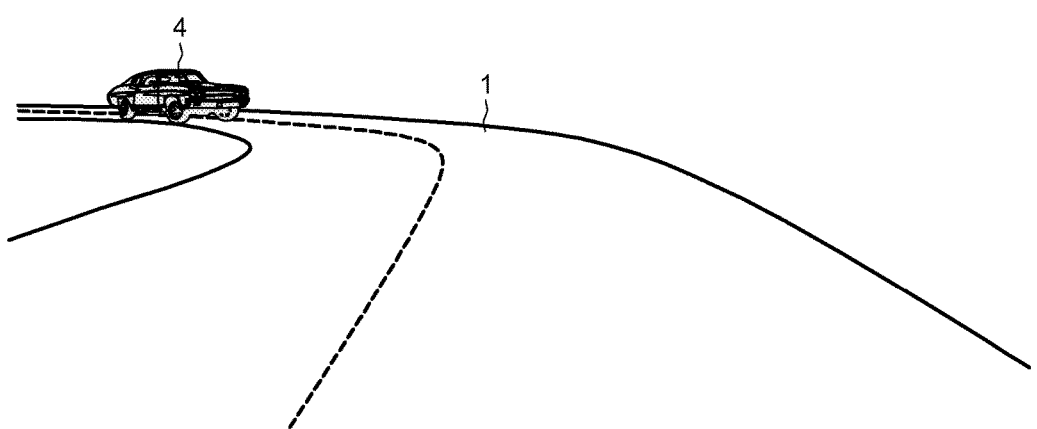

FIG. 2 represents a perspective view considered from vehicle 2, for example a view captured by a sensor which is used to observe objects in motion in front of the vehicle. As it will be observed, the curvature of the highway 1 and the arrival of the vehicle 4 in the other direction make it impossible for the sensor to see the vehicle 3, which is concealed by the vehicle 4.

By using information obtained beforehand, it is possible to determine that the vehicle 3 is concealed, and to anticipate its movement in order to prevent acceleration of the vehicle. However, if the objects observed are not of the same type, for example, if, rather than a car 3, a motorcycle is being followed, the dimensions of which are different from those of a car, it will then be necessary to establish that the vehicle 3 is a motorcycle, in order to predict more accurately how it will move and reappear after being concealed by the vehicle. The invention permits the identification of the type of target which is being tracked.

Figure 3:
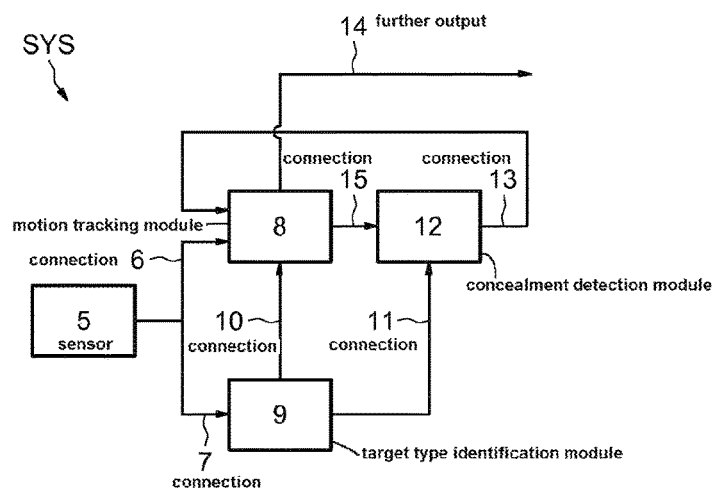
FIG. 3 shows a schematic illustration of a system for the tracking of targets, according to one mode of embodiment of the invention.

FIG. 3 represents a system SYS for the tracking of targets according to the invention.

The system SYS comprises a sensor 5, for example a video camera or radar device or, in general, a target observation module, which is configured for the delivery of information on objects which are observed directly by the sensor. It will be understood that, if an object is concealed, no information concerning this concealed object will be delivered at the output of the sensor.

The system SYS also comprises a motion tracking module 8 which is configured to track the movements of targets, a target type identification module 9 which is configured to identify the type of target being tracked by the sensor 5, and a concealment detection module 12 which is configured to determine whether a target is concealed.

The input of the module 8 is connected to the output of the sensor 5 by a connection 6. The module 8 is also connected to the output of the module 9 by a connection 10. The input of the target type identification module 9 is connected to the output of the sensor 5 by a connection 7.

The output of the concealment detection module 12 communicates via a connection 13 with the module 8 which is configured to track the movement of targets. In addition, a connection 15 permits the motion tracking module 8 to deliver information to the concealment detection module 12. A further output 14 on the motion tracking module 8 permits the acquisition of status data for corrected targets, i.e. information regarding the type, position, speed and direction of motion of a plurality of targets, even where some of these targets are concealed. This output 14 from the module 8 may be delivered, for example, to a driver assistance device, for example a speed regulation system.

It may be observed that, conversely to systems which are known from the prior art, this system employs a target type identification module, and the information supplied by this module permits the more accurate determination of whether a target is concealed, specifically in the concealment detection module 12, and also permits the more accurate tracking of targets in the motion tracking module 8.

Figure 4:
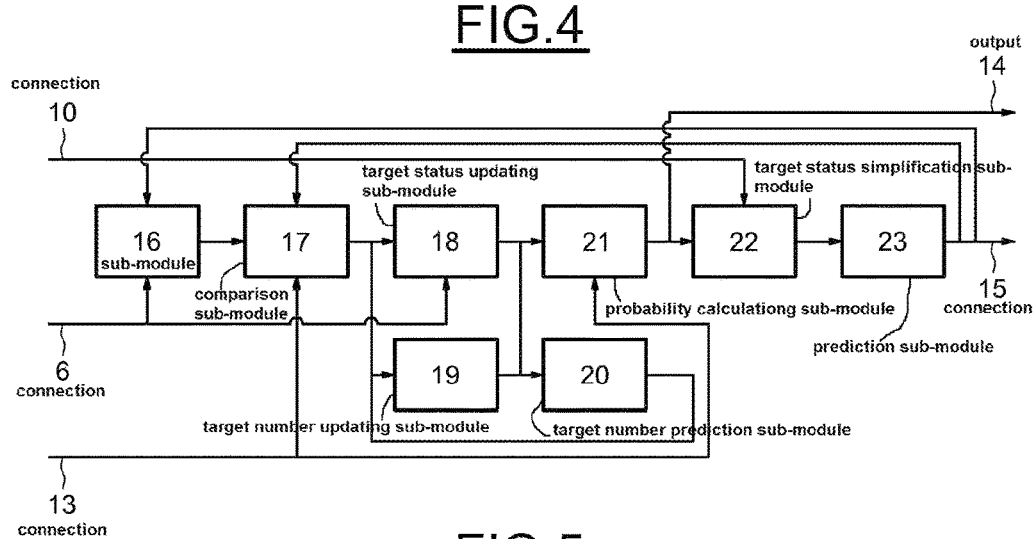
FIGS. 4 to 7 show schematic illustrations of the modules of a tracking system according to one mode of embodiment of the invention.

FIG. 4 shows a more detailed representation of the target motion tracking module 8. This figure also represents the connections already described with reference to FIG. 3, for the establishment of communications between the target motion tracking module 8 and the other modules of the system SYS. More specifically, representation is included of the connection 13 between the output of the concealment detection module 12 and the motion tracking module 8, the connection 15 between an output of the motion tracking module 8 and the concealment detection module 12, the connection 10 between the output of the target type identification module 9 and the motion tracking module 8, and the connection 6 between the sensor 5 and the motion tracking module 8.

The motion tracking module 8 is a self-looped module in which the output 15 for communication with the concealment detection module 12 is also configured as the input for a number of sub-modules of the motion tracking module 8.

The motion tracking module 8 specifically comprises a first sub-module 16 for the detection of new targets, which is configured to determine whether further targets have appeared, specifically by reference to measurements (i.e. information delivered directly by the sensor), to identify the type of targets already present, and to predict the status of targets.

Output from the sub-module 16 for the detection of new targets is delivered to a comparison sub-module 17 which is configured to compare measurements with the targets, in order to confirm the results generated by the sub-module 16 for the detection of new targets. Specifically, the comparison sub-module 17 determines whether it is probable that the targets detected by the sensor are new targets, rather than objects which are already present. It is therefore relevant to use information on the target type of targets already present, together with information on their positions and their movements.

Output from the comparison sub-module 17 is delivered to a target status updating sub-module 18, in which information relating to targets, such as their position or speed, is updated with reference to information obtained during a previous deployment of the tracking function, specifically on the basis of measurements.

Output from the comparison sub-module 17 is also delivered to a target number updating sub-module 19, in which the number of targets tracked is updated, after which a target number prediction sub-module 20 predicts the number of subsequent targets. In practice, it is possible to predict that a target will disappear, and will no longer require tracking. Output from the target number prediction sub-module 20 is looped to the input of the target number updating sub-module 19.

Outputs from the target status updating sub-module 18 and the target number updating sub-module 19 are also delivered to a probability calculation sub-module 21, which is configured to deliver data relating to the probability of the existence of targets, for example two-dimensional Gaussian functions.

Output from the probability calculation sub-module 21 is delivered to a target status simplification sub-module 22 which permits, for example, the elimination of targets, the probability of existence of which is too low or, for example, the merging of two targets which are too close to each other (i.e. the Gaussian functions of which are too close). This simplification is applied in consideration of target types. In practice, a target corresponding to a pedestrian which closely matches a target corresponding to a vehicle must not be merged with the vehicle target.

Finally, the motion tracking module 8 comprises a prediction sub-module 23, in which the status of targets is predicted, thereby delivering for example, via the connection 15, information on subsequent target steps to the concealment detection module 12.

Figure 5:
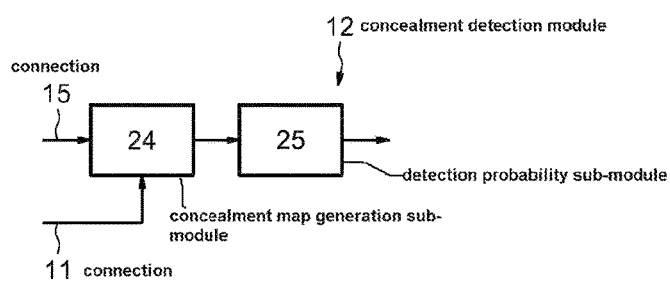

FIG. 5 shows a more detailed representation of the concealment detection module 12. Input to this module is delivered by the connections 15 and 11, corresponding respectively to a prediction of target status and information on the target type. The concealment detection module 12 comprises a concealment map generation sub-module 24, which permits the generation of a concealment map, communicating with a detection probability sub-module 25, which is designed to generate information relating to the probability of target detection on the motion tracking module 8. More specifically, a detection probability is associated with each target in the detection probability sub-module 25.

Figure 6:
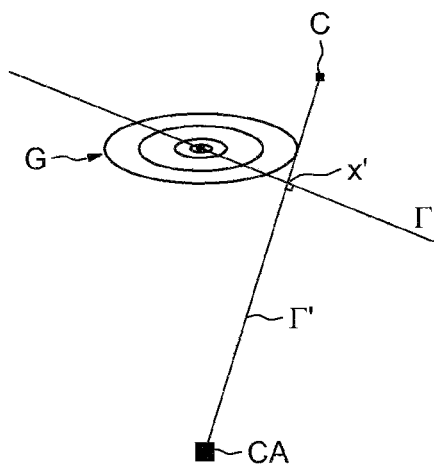

FIG. 6 shows a schematic representation of a two-dimensional Gaussian function G associated with a target which is liable to conceal another target positioned at the point C, viewed by a sensor CA. The equations presented hereinafter can be used to determine the probability of detection of a target situated at a coordinate point (x, y), said probability being designated as $Pd_{occ}(x, y)$. Where Pd (x, y) is the probability of detection associated with the sensor, $P_{\overline{occ}}(x, y)$ is the probability that a target situated at the coordinate point (x, y) will not be concealed, j is the index associated with the Gaussian function G, $w_j$ is the probability of existence of predicted targets, and $Po_j(x, y)$ is the probability that a target is present between the sensor CA and the target C, this gives the following:

$$Pd_{occ}(x, y) = Pd(x, y) \times P_{\overline{occ}}(x, y)$$

$$P_{\overline{occ}}(x, y) = \prod_j (1 - w_j Po_j(x, y))$$

FIG. 6 also includes a representation of the straight line Γ' which passes through the point C and the sensor CA, and the straight line Γ which is orthogonal to the straight line Γ' and passes through the center of the Gaussian function G. The point x' corresponds to the projection of the mean or the center of the Gaussian function G onto the straight line F. Where $f_G^\Gamma$ is the projection of the Gaussian function onto the straight line Γ, $\sigma_U$ is the width of the target C, Pu is the function representing the concealment capability of the target, as a function of the distance from the point to the center of the target derived from $\sigma_U$ (the closer the point to the center of the target, the higher the concealment capability of this target, whereby this function takes account of the variance in the target height), $\sigma_G$ is the variance in the marginal value of the Gaussian function projected onto the straight line Γ, and d is the distance between the center of the Gaussian function and the point x', this gives the following:

$$Po_j(x, y) = (f_G^\Gamma * Pu)(x')$$

$$(f_G^\Gamma * Pu)(x') = \frac{\sigma_U \sqrt{2\pi}}{\sqrt{2\pi(\sigma_G^2 + \sigma_U^2)}} e^{\frac{-(d^2)}{2\sqrt{\sigma_G^2 + \sigma_U^2}}}$$

These two equations permit the deduction of the probability $Pd_{occ}(x, y)$, which can then be delivered to the detection probability module 25. This detection probability module 25 permits the allocation, on the basis of the map generated from $Pd_{occ}(x, y)$, of a detection probability to each target. This allocation can be effected by selecting the mapped value at the mean point of the Gaussian function representing the target, or by determining an average for the detection probability $Pd_{occ}(x, y)$, weighted by the probability of the presence of the target, taking account of the variance in the density function representing the position of the target.

As a variant, the concealment detection module 12 may deliver results in binary form, corresponding either to a visible object or to a non-visible object, rather than delivering probabilities. Calculations are simplified accordingly.

Figure 7:
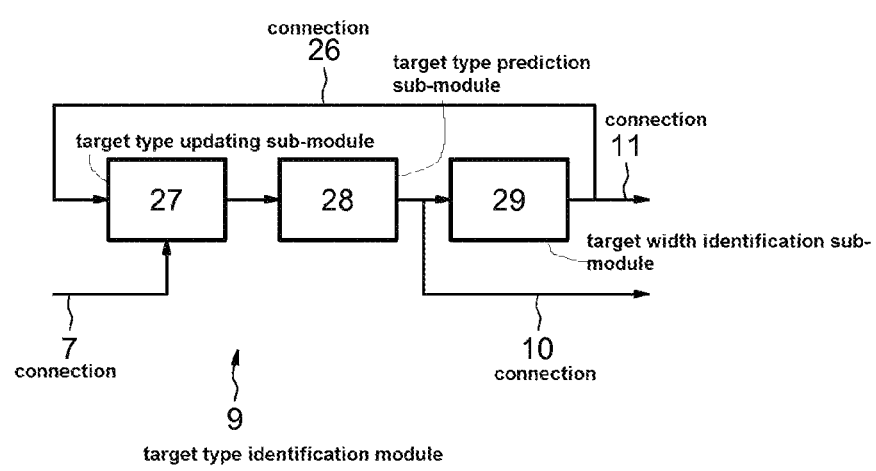

FIG. 7 shows a more detailed representation of the target type identification module 9. It will be observed that this module is self-looped via a connection 26 and, as input, receives information from the sensor via the connection 7. Output information on the type of target is delivered via the connections 10 and 11.

The target type identification module 9 comprises a target type updating sub-module 27, which is configured for the execution of a Bayesian update of target type probability. The target type may correspond to a discrete probability density function which describes the potential target type.

On a highway, the target type may be, for example, unknown, a pedestrian, a two-wheeled vehicle, a car or a truck (designated as $t_i$, where i varies between 0 and 4). Where $X_{type}$ is the target type, $P_k(X_{type}=t_i)$ is the probability at a given instant k that a target will be of type $t_i$, and $P(Z_{type}|X_{type}=t_i)$ is the plausibility of measurement in relation to the target, in respect of type (originating, for example, from a confusion matrix associated with the classification system of the sensor), this gives the following:

$$P_k(Xt_{type} = t_i) = \frac{P(Z_{type}|X_{type}=t_i) * P_{k-1}(Xt_{type}=t_i)}{\sum_{j=0}^{4} P(Z_{type}|X_{type}=tj) * P_{k-1}(X_{type}=tj)}$$

A target type prediction sub-module 28, which may be incorporated, for example, into the module 8, determines the probabilities $P_k(X_{type}=t_i)$.

The target type identification module 9 also comprises a target width identification sub-module 29 which is capable, for example, of delivering this width value to the concealment detection module 12.

Where Li is the typical width of an object of type ti, the width of a target is given by the following formula:

$$\sigma_U = \sum_{i=0}^{4} P_k(X_{type}=t_i) * Li$$

It may be observed that, in the prior art, tracking modules such as the motion tracking module 8 apply a plausibility value for the association of targets with the objects measured and perceived by sensors. The identification of targets to be taken into consideration is improved accordingly. By the use of information relating to target type, the identification of targets is improved. Where $f(Z_{etat}|X_{etat})$ is the plausibility applied in a module according to the prior art, in this case, the plausibility $f(Z|X)$ is given by the following equations:

$$f(Z|X) = f_{etat}(Z_{etat}|X_{etat}) * f_{type}(Z_{type}|X_{type})$$

$$f_{type}(Z_{type}|X_{type}) = \sum_{j=0}^{4} P(Z_{type}|X_{type}=tj) * P_{k-1}(X_{type}=tj)$$

Moreover, the simplification sub-module 22 of the motion tracking module 8 is able to simplify targets as a function of distance, in consideration of the target type. This simplification is achieved by calculating the distance between two two-dimensional Gaussian functions in close proximity, and by modifying this distance as a function of the estimated target type. For example, the distance calculation which will be known to an expert in the field as the Bhattcharyya method may be applied to calculate the distance between two discrete probability density functions.

Where $D(X^1_{type}|X^2_{type})$ is the distance between a target 1 and a target 2, taking the target type into consideration, and $D_{etat}(X^1_{etat}|X^2_{etat})$ is the distance obtained in the conventional manner, without taking the target type into consideration, this gives the following:

$$D(X^1|X^2) = D_{etat}(X^1_{etat}|X^2_{etat}) + D_{type}(X^1_{type}|X^2_{type})$$

$$D_{type}(X^1_{type}|X^2_{type}) = -\ln\left(\sum_{j=0}^{4} \sqrt{P_k(X^1_{type}=tj)P_k(X^2_{type}=tj)}\right)$$

The invention permits an improvement in the accuracy of the tracking of target objects in motion. Specifically, it permits an improvement in the identification of the number of targets, an improvement in the determination of the plausibility of measurements in relation to a target, and the more straightforward association of a target with an object which is perceived or measured by a sensor.

The safety of the users of motor vehicles is also improved.

The invention claimed is:

1. A method for the tracking of target objects in motion using an on-board system of a vehicle, the method comprising:
    observing targets;
    determining, recursively, a target type of the targets;
    tracking, recursively, movements of said targets, the tracking including predicting movements of said targets; and
    determining whether a target is concealed,
    wherein the tracking and the determining whether a target is concealed are deployed in consideration of the target type of the targets.

2. The method as claimed in claim 1, wherein the determining the target type comprises determining of a width of a target, and the determining whether a target is concealed is deployed in consideration of the target width.

3. The method as claimed in claim 1, wherein the tracking comprises:
    determining an appearance of further targets;
    comparing the observing and a prediction of a status of targets; and simplifying the status of targets,
    wherein the tracking of the movements of said targets is deployed in consideration of the target type.

4. The method as claimed in claim 1, wherein the determining whether a target is concealed comprises constructing a concealment map in consideration of the target type.

5. The method as claimed in claim 1, wherein the determining the target type comprises:
    updating of the target types;
    predicting the target type; and
    determining a target width.

6. A system for tracking target objects in motion, comprising:
    a first module to observe targets;
    a second module configured to track movements of said targets, the second module being self-looped;
    a third module configured to determine whether a target is concealed; and
    a self-looped module configured to determine a target type,
    wherein the self-looped module communicates with the second module and the third module.

7. The system as claimed in claim 6, wherein the self-looped module is configured to identify a width of a target and to communicate said width to the third module.

8. The system as claimed in claim 6, wherein the second module comprises:
    a sub-module to determine an appearance of farther targets;
    a sub-module to compare measurements generated by sensor with a prediction of a status of targets; and
    a sub-module to simplify the status of targets,
    wherein the sub-modules of the second module communicate with the self-looped module.

9. The system as claimed in claim 6, wherein the third module comprises a sub-module to construct a concealment map, and the sub-module of the third module communicates with the self-looped module.

10. The system as claimed in claim 6, wherein the self-looped module comprises:
    a sub-module to update the target types;
    a sub-module to predict the target types; and
    a sub-module to determine target widths.

11. A motor vehicle comprising:
the system as claimed in claim 6.

12. A method for the tracking of target objects in motion using an on-board system of a vehicle, the method comprising:
- observing targets;
- determining, recursively, a target type of the targets;
- tracking, recursively, movements of said targets, the tracking including predicting movements of said targets; and
- determining whether a target is concealed,
- wherein the tracking and the determining whether a target is concealed are deployed in consideration of the target type of the targets, and
- wherein the method is performed during movement of the vehicle.

* * * * *